United States Patent
Wiens

(10) Patent No.: US 6,223,829 B1
(45) Date of Patent: May 1, 2001

(54) GOLF GREEN REPAIR APPARATUS AND METHOD

(76) Inventor: Terry G. Wiens, 1814 - 196th Street, Langley, British Columbia (CA), V3A 4P4

( * ) Notice: Subject to any disclaimer, the term of this patent is extended or adjusted under 35 U.S.C. 154(b) by 0 days.

(21) Appl. No.: 09/207,400

(22) Filed: Dec. 8, 1998

Related U.S. Application Data

(60) Provisional application No. 60/067,705, filed on Dec. 8, 1997.

(51) Int. Cl.[7] .................................................. A01B 79/00
(52) U.S. Cl. .......................... 172/1; 172/378; 473/286; 473/408
(58) Field of Search ..................................... 172/378, 371, 172/373, 374, 375, 1, 41, 21; 473/286, 408; 248/156

(56) References Cited

U.S. PATENT DOCUMENTS

| | | | |
|---|---|---|---|
| 3,049,182 | * | 8/1962 | Pelow .................................... 172/378 |
| 3,539,017 | * | 11/1970 | Johnson ................................ 172/378 |
| 3,774,913 | * | 11/1973 | Dien ..................................... 273/162 D |
| 4,951,951 | * | 8/1990 | Meyer ................................... 273/162 F |
| 4,955,609 | * | 9/1990 | Kassen .................................. 273/162 R |
| 5,209,469 | * | 5/1993 | Laskowitz et al. ................... 172/378 X |
| 5,405,133 | * | 4/1995 | Upton ................................... 172/378 X |
| 5,437,449 | * | 8/1995 | Zink ..................................... 273/32 B |
| 5,511,785 | * | 4/1996 | Rusin, Jr. ............................. 172/378 X |

* cited by examiner

*Primary Examiner*—Victor Batson
(74) *Attorney, Agent, or Firm*—Robert B. Hughes; Hughes & Schacht, PLLC

(57) ABSTRACT

A method and apparatus to repair dents formed by a golf ball impacting the surface of a golf green. A restoring tool is mounted to the top of the handle of a putter, and this tool comprises a base member and a ground penetrating portion which is formed as a pair of tines and which is rotatably mounted to move from a stowed position flush against the base, to an operating position where it extends at right angles to the base. The putter is inverted so that the end of the handle can be positioned against the raised edge of the dent. The tines (outwardly extending) are moved to penetrate into the soil at a location outwardly of the raised edge of the dent, and the compression surface of the base member presses the sod layer downwardly and displaces the underlying ground layer laterally to fill into the recess portion of the dent. This also causes the displaced portion of the sod laterally over the dent.

21 Claims, 5 Drawing Sheets

GOLF GREEN REPAIR APPARATUS AND METHOD

This appln claims benefit of provisional appln 60/067,705 filed Dec. 8, 1997.

BACKGROUND OF THE INVENTION a) Field of the Invention

The present invention relates to an apparatus and method for repairing a golf green, and more particularly to repairing a dent or indented area of the golf green caused by the impact of a golf ball landing on the golf green (i.e. putting surface).

b) Background of the Invention

When a golf ball lands on a golf green, it often causes a dent in the golf green, with a raised edge portion extending at least partially around the dent created by the golf ball.

Possibly the most common method employed to repair such ball indentations on the putting surface is for the golfer to use a golf tee to dig into the ground surface surrounding the raised edge and pry the earth near the surface inwardly toward the area of the dent. Alternatively, a two pronged fork can be used for this purpose, this being usually made of aluminum,, and sometimes referred to as a "ball mark fixer".

With either method, the golfer must kneel down or bend down far enough to reach the surface of the putting green with his hand and push the tool into the sod around the indentation. In a good deal of instances, many golfers, particularly elderly or infrequent golfers do not take the trouble to make such repairs, and it is necessary for these to be attended to by green keepers. Further, this prior art method of repairing the green is not particularly effective and falls far short of restoring the green close to its previous condition.

DESCRIPTION OF THE PREFERRED EMBODIMENT

It is believed that a clear understanding of the present invention will be obtained by first describing, with reference to FIGS. 1 through 4, how a dent is commonly formed in the golf green by a golf ball, and one of the common prior art methods of making the repair in the golf green.

Figure 2:
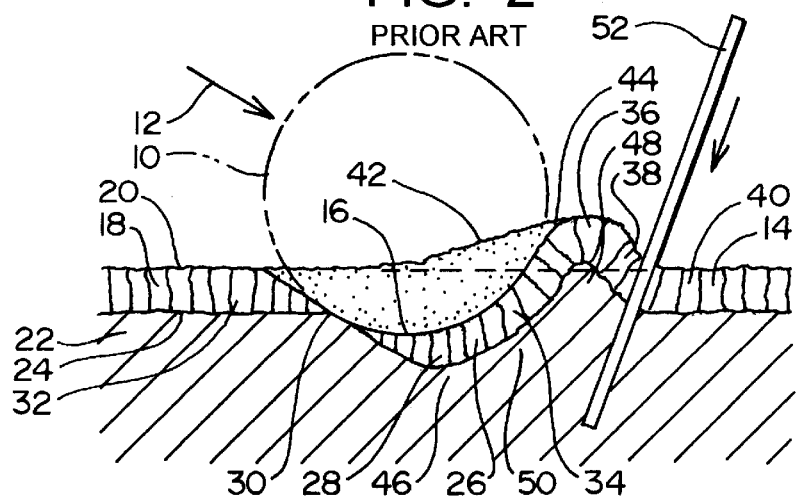
FIGS. 2, 3 and 4 are cross sectional views taken along a vertical plane parallel to the line of flight of the ball making the dent and extending through the center of the dent in the green, these three views showing in sequence the typical prior art manner of using the "ball mark fixer" in repairing the green.

With reference to FIG. 2, there is shown in broken lines a golf ball 10 having descended on a downwardly sloping path (indicating by the arrow 12) to engage the golf green 14 and form the dent or indentation 16. For purposes of description, the golf green 14 can be considered of being made up of two layers. First, there is the upper sod layer 18 which provides the green putting surface 20, and an underlying ground layer 22 immediately below the sod layer 18. The interface of the sod layer 18 and the ground layer 22 is indicated at 24.

In the following description, the term "forward" will refer to the direction of the horizontal component of the path of the ball as it impacts the green, and the term "rear" or "rearward" will denote the opposite direction. Thus, in FIG. 2, the term forward refers to a direct extending toward the right.

As shown in FIG. 2 when the golf ball 10 strikes the green surface 20 as it travels on its downward and forward path (indicated at 12), the sod layer portion 26 immediately below and just forward of the impact location of the golf ball is pushed both downwardly and forwardly (to the right as seen in FIG. 2).

More specifically, there is a rear sod portion 28 that has been pushed downwardly and forwardly, as shown in FIG. 2. As shown in FIG. 2, this sod portion 28 has actually been severed (or at least partially severed) along a separation line 30 from a further rear portion of sod 32 which is just rear of the location where the location of the ball 10 impacts the green surface 20, and is undisturbed. However, it is to be understood that this pattern of the displacement of the sod layer 18 is not always the same, depending upon the conditions of the green. However, the situation as shown in FIG. 2 is typical. Just forwardly of the sod portion 28, there is an upwardly and forwardly sloping sod portion 34 that forms an upwardly and forward sloping part of the dent 16, and further forward of the portion 34 there is a raised edge portion 36, which then slopes downwardly and forwardly at 38, joining a yet further forward portion of the green 40 which remains level and undisturbed.

In addition, the impact of the golf ball 10 also displaces the ground material laterally, as indicated at 42, so that the raised sod portion 36 and the edge portion 42 create an edge perimeter portion which shall be designated collectively as 44.

In addition to the sod layer 18 being displaced as described above, the immediate underlying ground layer 22 is also displaced. More specifically, a portion of the ground layer that was immediately below the location where the ball impacts the green is displaced in a manner to create a lower portion 46 just beneath the sod layer portion 28, a raised edge portion 48 which is just beneath the upper sod edge portion 36, and an intermediate portion 50.

Again, it is to be understood that the contours of the dent 16 vary, depending upon the path of the ball (whether it is descending in a more vertical slope or more horizontally aligned), the hardness of the underlying ground layer 22, resistance of the sod layer 18 to being separated and/or compressed, etc.

Figure 1:
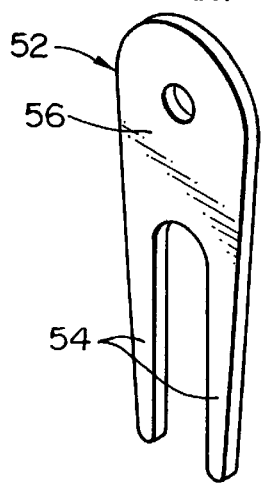
FIG. 1 is an isometric view of a commonly used prior art tool, called the "ball mark fixer"

In FIG. 1, there is shown the prior art "ball mark fixer" 52. It can be seen in FIG. 1 that this has a generally U shaped configuration, comprising two generally parallel arms or tines 54 that form the sides of the U, and a base gripping portion 56 that provides opposite gripping surfaces by which the tool 52 can be grasped in a person's fingers and manipulated.

Figure 3:
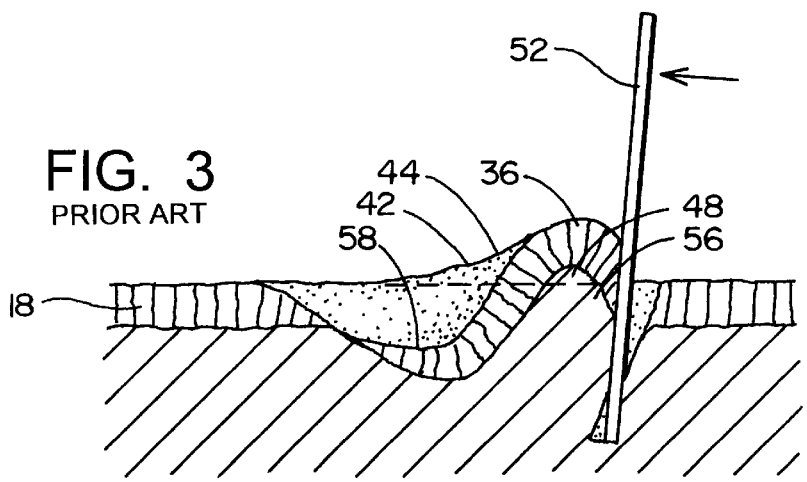
Figure 4:
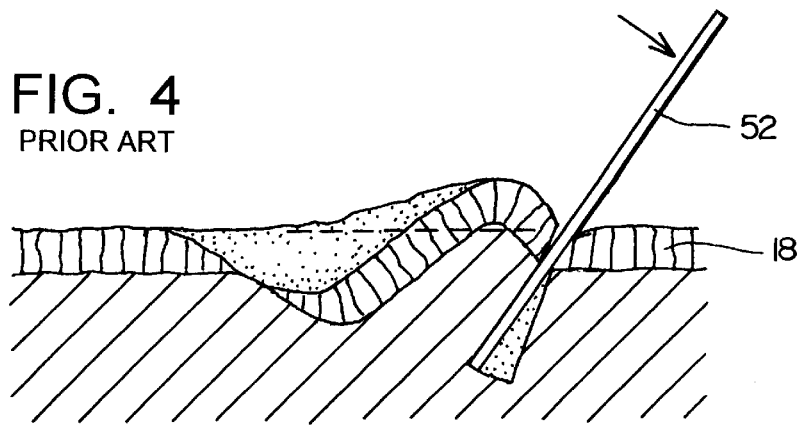

The manner in which this is used is shown in FIG. 2, where it can be seen that the tool 52 is pushed into the ground around the perimeter edge portion 44 of the dent, and as shown in FIGS. 3 and 4, the tool 52 is manipulated by rotating it about a horizontal axis to displace some of the underlying earth 56 toward the center location 58 of the dent 16. The effect of this is to push the edge portion of the dent forming material (namely the upper edge portion 36 of the sod and the lower portion 48 of the underlying ground layer to the left. After this has been accomplished, the green surface 20 can be flattened to some extent by pressing the head of the club or other surface against the green surface at the location of the dent 16.

As indicated previously, an alternative method of repairing the green is simply to use a golf tee which is stuck into the green surface a number of times around the perimeter of the dent, again preying the earth and the sod forming the raised edge portion around the dent inwardly toward the center 58, and then flattening out the green surface.

Overall, the above method is only partially effective. It does cause an overall displacement in the material forming the sod layer 18 and underlying ground layer 22 toward the dent 16, but it is rather lacking in restoring the green surface to a condition closer to its original form (i.e. where the sod layer is a uniform layer having a reasonably flat upper green surface 20).

With the foregoing in mind as background information, there will now be a description of the present invention.

Figure 5:
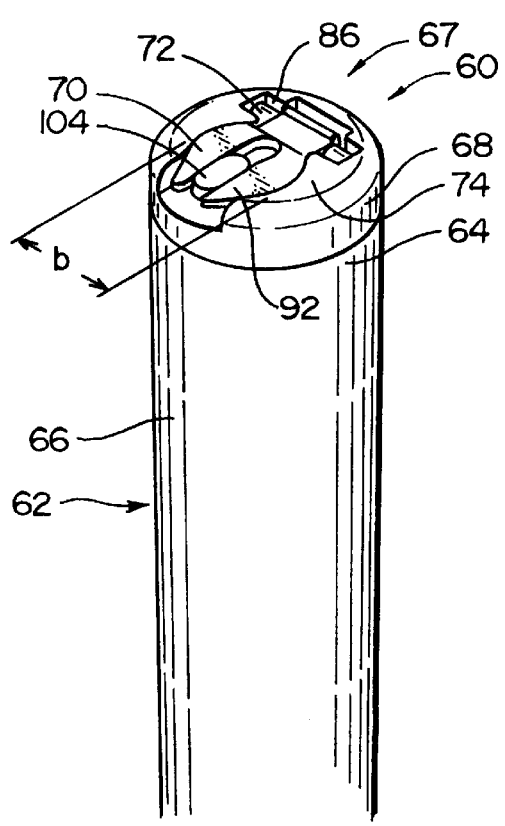
FIG. 5 is an isometric view showing the apparatus of the present invention mounted to the top end of the handle of a putter, with the apparatus in its stowed position.
Figure 6:
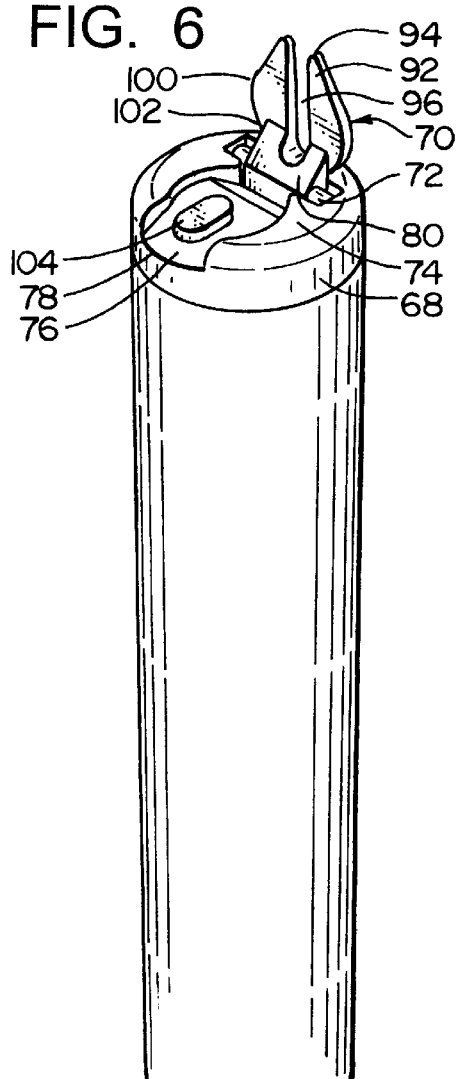
FIG. 6 is an isometric view similar to FIG. 5, but showing the apparatus in its operating position, with the ground penetrating portion extending outwardly from the upper surface of the apparatus.
Figure 5A:
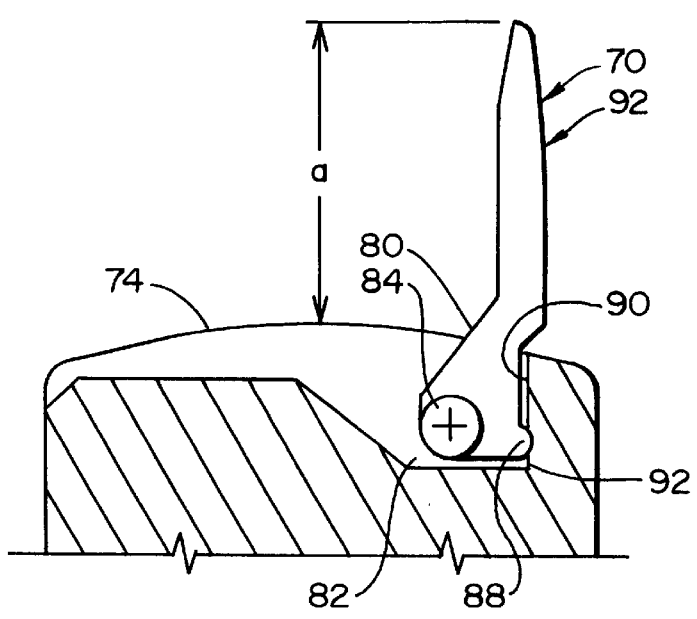
FIG. 5A is a sectional view taken along a vertical plane perpendicular to the axis of rotation of the ground penetrating portion of the apparatus of the present invention, showing in solid lines the ground penetrating portion in its operating position and in broken lines in its outwardly extending operating position.

With reference to FIGS. 5, 5A and 6, the present invention comprises a manipulating tool 60, and also comprises the combination of the tool 60 joined to the putter 62. More particularly, the tool 60 of the present invention is conveniently connected at the upper end 64 of the putting handle 66 to form functionally a unitary green repairing implement 67.

The tool 60 comprises a base portion 68 and a ground penetrating member 70 that is rotatably mounted to the base 68 about a hinge mounting 72. The ground penetrating portion 70 has a stowed position shown in FIG. 5 where it lies against the upper surface 74 of the base portion 68, and actually is positioned in a recess 76 formed in the upper surface 74 of the base portion 68. Then there is an operating position, where the ground penetrating portion 70 is rotated 90° from its stowed position to extend perpendicular to the base surface 74 and parallel to the longitudinal axis of the putter handle 66.

For purposes of description, the term "upper" will denote the direction extending from the head of the club toward the handle, so that in FIGS. 5 and 6, the term "upper" is a direction toward the top of the page. The term "back" or "rear" shall denote the location at the hinge mount 72, and the term "forward" or "front" shall denote the location at 78, which is diametrically opposite to the hinged location 72.

The ground penetrating member 70 comprises a mounting portion 80 positioned in a cavity 82 at the rear portion of the base 68. The mounting portion 80 has two laterally extending fingers or trunions 84 which fit into smaller hinge recesses 86 on opposite sides of the mounting cavity 82, these fingers 84 providing the hinge mounting 72 for the ground penetrating member 70.

The mounting portion 80 has a protruding lip 88 (see FIG. 5A) which protrudes radially outwardly from the center of the mounting fingers 84 and extends parallel to the axis of rotation of the ground penetrating member 70. This protruding lip 88 cooperates with the back surface 90 of the mounting cavity 82 to hold the ground penetrating member 70 firmly in its operating position. More specifically, when the ground penetrating member 70 is in its outwardly extending operating position, the protruding lip 88 is positioned in a rear lower corner edge 92 of the cavity 82 adjacent to the bottom part of surface 90, to resist rotational movement of the ground penetrating member 70. Then to rotate the member 70 to its stowed position, the member 70 is pushed forwardly and downwardly to force the lip 88 along the cavity surface 90 and to the stowed position as shown in the broken lines of FIG. 5A.

The trunion members 84 have a snap fit in the hinge recesses 86 so that the ground penetrating member 70, made as a separate piece, is simply snapped into its engaged position, with the base 68.

The ground penetrating member 70 also has its ground penetrating portion 92 which comprises a pair of tines 92 spaced laterally from one another, and extending radially outwardly from the axis of rotation of the trunions 84, but offset a short distance from the center axis from the trunion members 84 to better position the tines 92 in the operating position, so that these are quite close to the back part of the base, and also to align the times 92 so that these properly fit into the recess 76 in the stowed position. The two tines 92 have a flat planar configuration and are aligned in the same plane. Each tine 92 has an outer tip portion 94, and the two tines 92 are spaced from one another to leave a central slot 96. The outside surfaces of each of the tines 92 slant from the tip 94 outwardly at a slant, toward an outer curved portion 100, and then slant back inwardly at 102. The recess 76 has a central protruding portion 104 which fits between the two tines 92 when the ground penetrating portion 70 is in its stowed position.

It will be noted that with the ground penetrating portion 70 in its stowed position (as in FIG. 5), the tool 60 is positioned unobtrusively in the top end of the handle 66 so that it does not at all interfere with the normal use of the putter 62 to execute a putting stroke. More specifically, the base portion 68 of the tool has circular disc like configuration having a diameter the same as the upper end of the putting handle 66 (approximately once inch in diameter), and it has an overall depth dimension of about one quarter of an inch. The tool 60 can be bonded to the upper transverse surface of the handle 66 in a variety of ways. Also another configuration is to extend the perimeter of the base member 68 downwardly to form a sleeve that would extend a short distance downwardly over the upper end of the handle 66, with the inside cylindrical surface of the sleeve being bonded to the handle 66.

To use the tool/putter combination 60/62 to repair the dent in the golf green, the ground penetration portion 70 is rotated 90° from the stowed position to its operating position of FIG. 6. As indicated previously with reference to FIG. 5A, the hinge mounting at 72 is arranged so that the protruding edge portion 88 is forced by the middle portion of the back cavity surface 90 (the material being sufficiently yielding to permit this) so that the edge 88 snaps down into the operating position to hold the ground penetrating portion 70 extended and firmly in place.

Initially, the putter 62 is inverted so that the head of the putter provides a convenient handle by which the putter 62 can be manipulated while the person is standing. The tool 60 is positioned so that the ground penetrating portion 70 (see FIG. 7) has its tip portion 94 just forwardly of the raised edge portion 36 of the sod layer 18 so that the tip 94 enters into the sod layer 18 at a location 104 immediately adjacent to the forward undisturbed portion of the sod layer 18, and just forward of the forward part of the raised edge 36.

Then (see FIG. 8) the putter 62 is pushed downwardly to cause the ground penetrating portion 70 to penetrate through the sod layer 18 and to some extent (depending on the depth of the sod layer 18) into the underlying ground layer 22. The top surface 74 of the base member 68 functions as a compression surface 74 to bear against the upper surface of the sod portion 36 at the raised edge forward of the dent 16. This has the effect of displacing the raised portion 48 of the ground layer 22 downwardly and then rearwardly toward the dent 16.

It should be noted that the penetration of the two tines 92 into the green layer 18 and further into the ground layer 22 serves two functions. First, it locates the base member 68 so that it maintains its proper position as the base member 68 presses against the edge sod portion 36. Also, the tines 92 cause a certain degree of separation of the ground material so that the compressive force applied by the base member 68 acts on the green layer portion 36 and on the underlying ground portion 48 to cause the displacement of the ground layer portion 48 toward the left, so that this ground layer portion 48 becomes positioned further rearwardly in the area indicated at 106 in FIG. 8.

Figure 7:
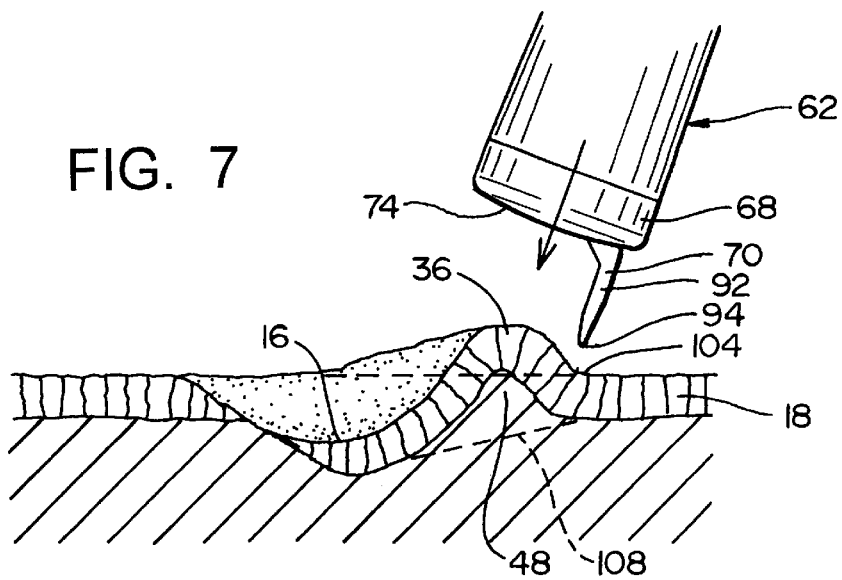
FIGS. 7 and 8 are partial sectional views taken at generally the same location (relative to the dent in the golf green) as FIGS. 1 through 3, but showing the operation of the present invention in making its initial movement or stroke into the green surface to begin the repair (restoring) operation of the green surface.

It should be noted (with reference to FIG. 8) that the underlying ground layer portion 48 that has been displaced from the region immediately below the main part of the dent 16 is loose soil in the sense that it has just previously been displaced from its original position, and thus would be more readily moveable. In FIG. 7, there has been drawn a broken line 108 that extends beneath the raised ground edge portion 48 to indicate generally the bottom location of the loosened ground material displaced by the ball impact. The effect of the compressive motion of the base member 68 from the position of FIG. 7 to the position of FIG. 8 thus has the overall effect of a lateral displacement where the sod layer 18 remains substantially in tact, but the underlying ground portion 48 is displaced laterally to occupy the position indicated at 106 in FIG. 8.

Figure 8:
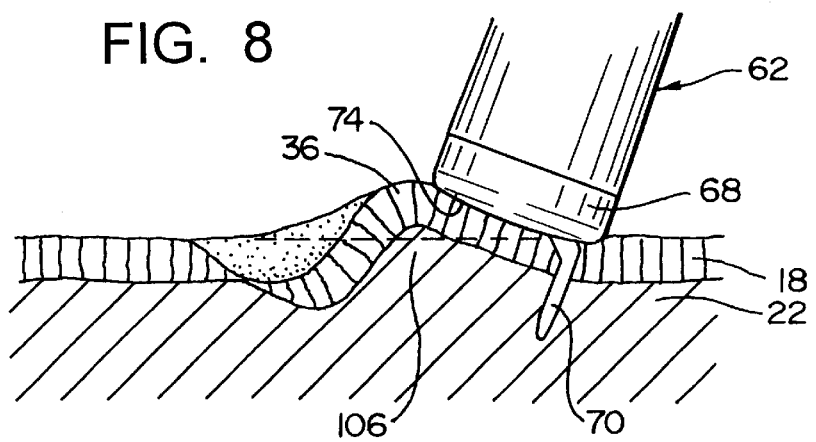
Figure 9:
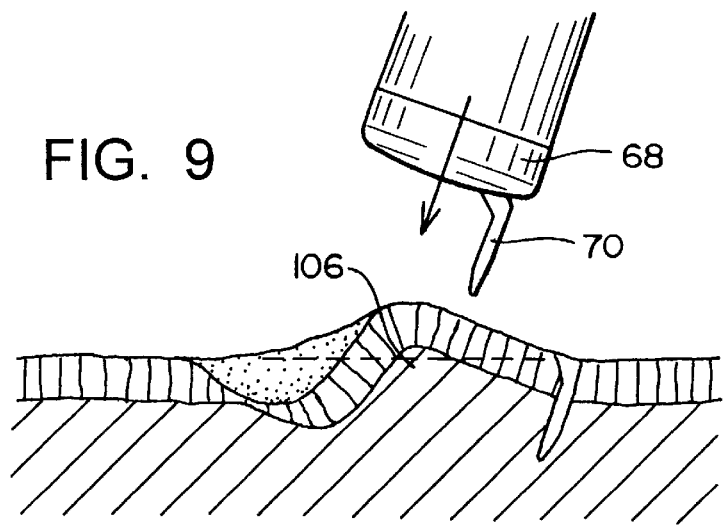
FIGS. 9 and 10 are views similar to FIGS. 7 and 8, but showing a subsequent repair stroke being executed into and against the green surface.
Figure 10:
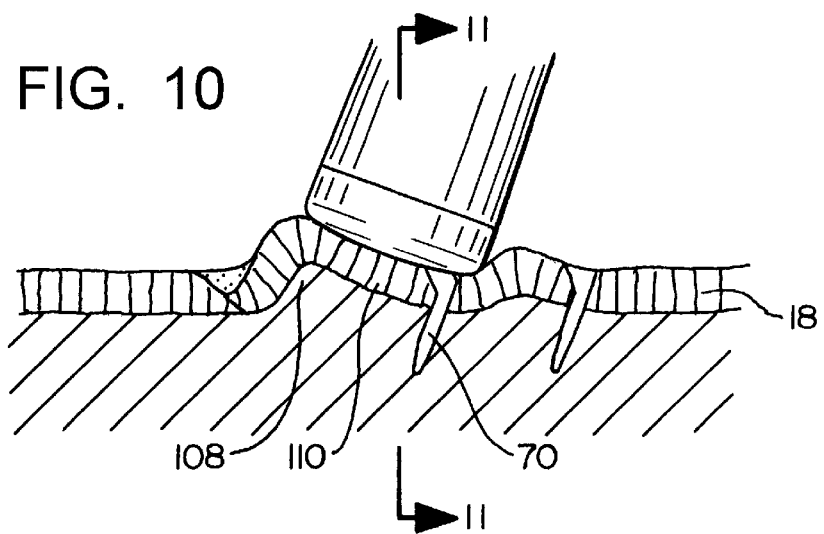

After the initial displacement has been accomplished, as shown in FIG. 8, then (see FIG. 9) the tool 60 is moved a short distance rearwardly from its position of FIG. 7 to the position of FIG. 9 and again is pushed into the sod layer (see FIG. 10) to cause a further compression of the ground layer portion 106 further to the left to fill the lower part of the cavity of the dent 16. This is accomplished in substantially the same manner as the compressive and displacement force is applied in FIGS. 7 and 8, to cause the underlying ground portion 106 (already displaced once to the location 106) to move further rearwardly to the location 108. Again, the sod layer at 110 (see FIG. 10) remains substantially undisturbed.

Figure 11:
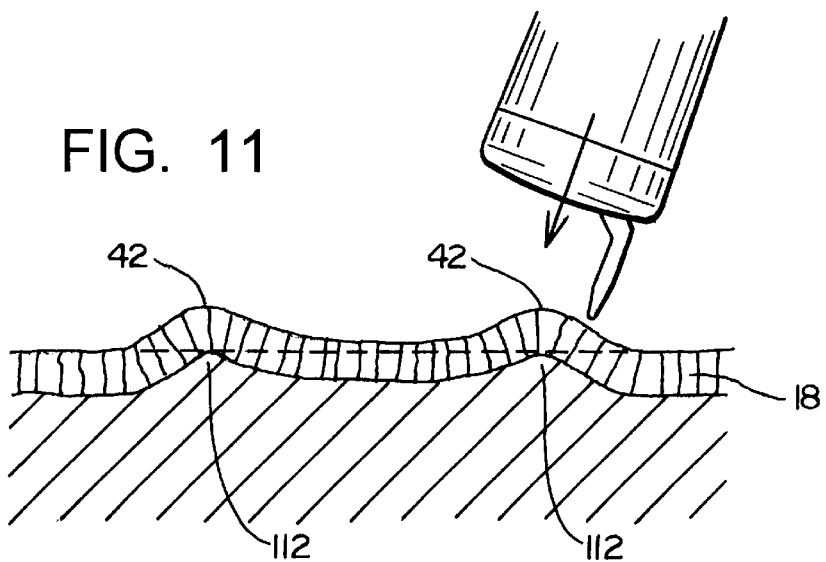
FIGS. 11 and 12 are similar to FIGS. 7 and 8 and also similar to FIGS. 9 and 10, showing the application of the present invention in engaging the raised side edge portions of the dent area in the green restoring operation.
Figure 12:
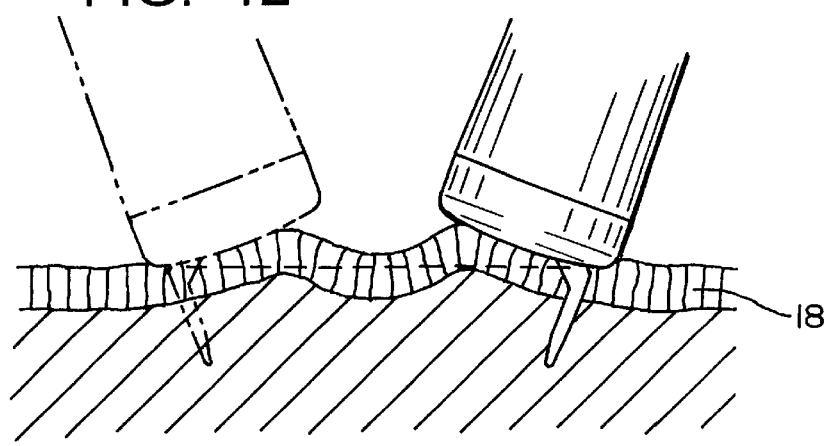
Figure 13:
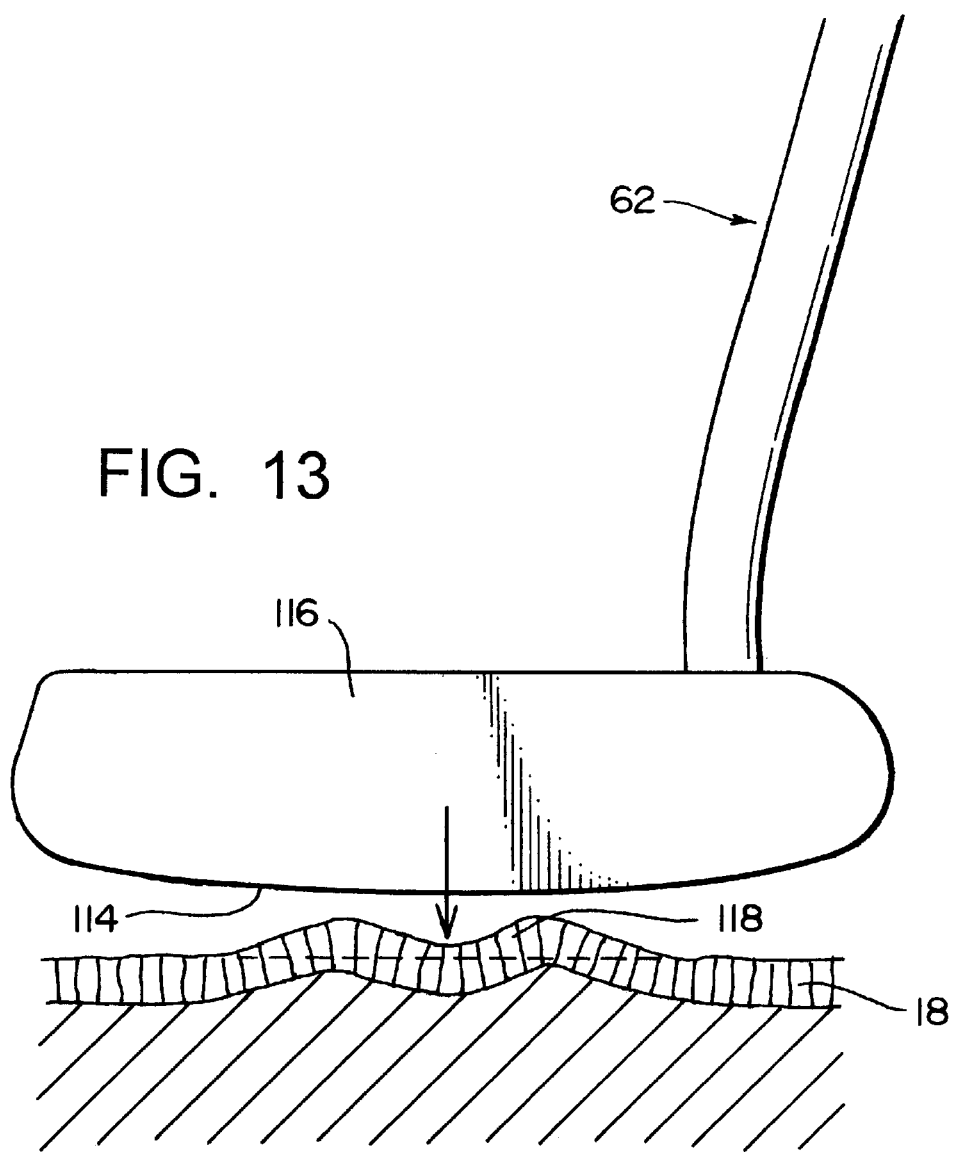
FIG. 13 is a sectional view, showing the bottom surface of the head of the putter being pressed the green surface to further flatten out the green surface.

The next step is to move the tool 60 to side locations to compress the side edge portions 42 of the sod layer 18 downwardly, and thus displace the raised earth portions 112 downwardly and toward the middle area of the dents 16. As illustrated in FIGS. 11 and 12, the tool is applied adjacent one side portion 42 in the manner described above, and then (as shown in the broken lines of FIG. 12) moved over to the opposite side to have a similar displacement action of the underlying ground surface portion 112.

It is believed to be evident that the precise location and manner in which the tool is applied will vary depending upon the soil conditions, the size and configuration of the dent 16, etc. The overall result which is to be achieved is to maintain the integrity of the sod layer so that when it is moved from its displaced position (see FIG. 7), back toward its restored position (see FIG. 12), the sod layer 18 is in large part moved back to its original location. Also, the desired result of the present invention is to move the underlying displaced ground layer portions 48 and 112 radially inwardly toward the dent 116 so that it is restored to its original position in the area where the dent 16 was formed.

Figure 14:
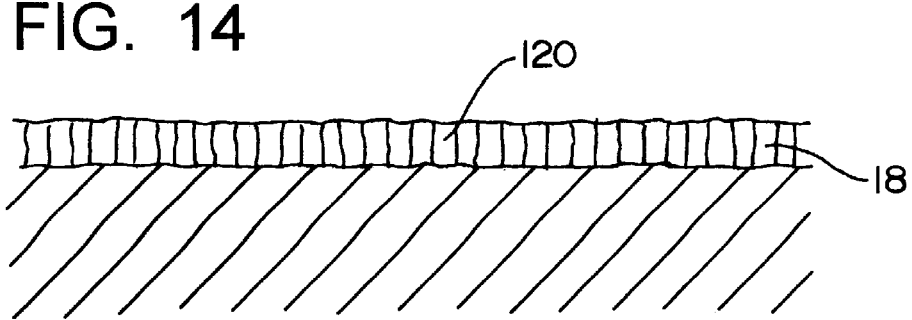
FIG. 14 is a view of the green surface, taken at the same location as FIG. 13, showing the green surface in its stored position.

As a final step, the putter is inverted to its normal upright position, and then the lower surface 114 of the head 116 against of the putter can be tamped downwardly against the restored sod portion 118 to form a relatively smooth continuous sod surface, as shown at 120 in FIG. 14.

With regard to the particular configuration of the tines 92 that form the ground penetrating portion of the tool 60, it has been found that the tool 60 of the present invention works quite satisfactorily if the end tips 94 of the tines 92 extend a half inch or a little bit more than a half inch above the upper surface 74 of the base member 68 (this dimension being indicated at "a" in FIG. 5A. Also, the lateral dimension between the lateral rounded portions 104 of the two tines 92 (this dimension being shown at "b" in FIG. 5) has been found to be satisfactory if it is made to be about one half inch.

Obviously, these dimensions could be varied. If the depth dimension (shown at "a" of FIG. 5A) is increased substantially there is no real benefit, and in fact it can in some instances make the tool more difficult to operate, particularly if the underlying ground layer 22 is hard, since more force must be applied to cause a deeper penetration so that the surface 74 comes into ground contact.

The tines 92 should extend far enough away from the compression surface 74 so that the tines 92 are able to penetrate far enough into the sod (and likely to some extent into the underlying ground layer 22) to provide its locating function and also to provide a separating function. Conceivably, the tines 92 could be extended possibly to three quarters of an inch and possibly even to an inch and obtain at least a major portion of the benefits of the present invention, but (as indicated above) the potential operational difficulties would be increased. Also, the tines 92 could be made somewhat shorter, possibly as short as three eighths of an inch or conceivably a half an inch, but again there would be no particular benefit in doing so, and certain operational benefits may well be lost.

It is to be understood that various modifications could be made to the present invention without departing from the basic teachings thereof.

What is claimed is:

1. A method of repairing a dent in a golf green having a green surface, caused by a golf ball impacting the green surface to form the dent which has a recessed region having a recessed location, and also a raised edge region radially outwardly of the recessed region at a raised edge location and extending at least partially around the recessed region, said method comprising:

a) providing a restoring tool comprising a base member having a compression surface and a ground penetrating member;

b) positioning the tool with the ground penetrating member at the raised edge location of the dent and moving the tool so that the ground penetrating member penetrates into the golf green and the compression surface engages the raised edge region and presses the raised edge region in a direction with a substantial downward force component to press the raised edge region downwardly and to cause a lateral displacement of material in the raised edge region radially inwardly toward the recessed region of the dent;

c) said method being further characterized by providing said restoring tool with an elongate member which is a golf club having a grip portion attached to said base member and a ball striking end portion spaced from the grip portion, said method being further characterized in positioning the golf club so that the grip portion is located to position the base member so that the compression surface is facing downwardly to press downwardly against the raised edge region, with the golf club extending in a generally upward direction from the green surface said method further comprising engaging the golf club to push said golf club downwardly to press the raised edge region downwardly to repair the dent;

d) said method further comprising positioning said ground penetrating member in a first stowed position where the ground penetrating member extends over the compression surface, and then moving the ground engaging member outwardly from the stowed position to an operating position extending outwardly from the compression surface, after which the tool is moved so that the ground penetrating member penetrates into the golf green.

2. The method as recited in claim 1, wherein said compression surface is positioned so that the location of the compression surface is aligned with the grip portion of the golf club.

3. The method as recited in claim 1, wherein said ground penetrating member is provided with a hinge connection at one side compression surface, said method further comprising moving the ground penetrating member from the compression surface about said hinge connection to said operating position.

4. The method as recited in claim 1, further comprising releasably locking said ground penetrating member in said operating position.

5. The method as recited in claim 4, further comprising releasably locking the ground penetrating member in said operating position by utilizing a protrusion member mounted to said ground penetrating member, and moving said protrusion member with the ground penetrating member from the stowed position to the operating position over a surface which resists movement of the ground penetrating member from the stowed position to the operating position and also resists movement of the ground engaging member from the operating position back to the stowed position, whereby said ground engaging member is yieldingly held in its stowed position and also yieldingly held in its operating position.

6. The method as recited in claim 1, wherein said ground penetrating member is configured with length and width dimensions such that when said ground penetrating member is located in its stowed position the ground engaging member is located substantially within an area of an end portion of the grip portion of the golf club.

7. The method as recited in claim 1, further comprising facilitating proper engagement of the compression surface with the raised edge portion by dimensioning and positioning said ground penetrating member so that an end penetrating portion of the ground penetrating member extends from the penetrating surface a distance no greater than about one inch.

8. The method as recited in claim 7, wherein said ground penetrating member extends outwardly from the compression surface the distance no greater than about three quarters of an inch.

9. The method as recited in claim 8, wherein said ground penetrating member extends outwardly from the compression surface the distance no greater than about one half of an inch.

10. The method as recited in claim 9, wherein said ground penetrating member extends outwardly from the compression surface the distance no greater than about three eighths of an inch.

11. The method as recited in claim 1, wherein after the tool is initially pressed against the raised edge region to cause the raised edge region to move downwardly and to cause a lateral displacement of material in the raised edge region to a second location, the tool is moved out of engagement with the green surface and positioned at a location adjacent to said second location, and then again moving the tool downwardly to cause the ground penetrating member to penetrate into the golf green and cause the compression surface to press downwardly against the green surface and cause further lateral displacement of the material of the raised edge region.

12. The method as recited in claim 1, wherein the compression surface is oriented to press the raised edge portion in a downward slant toward the recessed location.

13. The method as recited in claim 12, wherein said raised edge region has a radially inner portion adjacent to said recessed region a radially outer portion at an outer location of the raised edge portion and an intermediate raised portion, said ground protruding member is inserted into the green surface at a location positioned outwardly from the intermediate raised portion and near to the radially outer portion of the raised edge region.

14. The method as recited in claim 13, wherein said ground penetrating member has a generally flattened configuration, with a surface area which, when the ground penetrating member is moved through the green surface, located near a ground portion which is displaced into said raised edge region.

15. The method as recited in claim 1, wherein said raised edge region has a radially inner portion adjacent to said recessed region a radially outer portion at an outer location of the raised edge portion and an intermediate raised portion, said ground protruding member is inserted into the green surface at a location positioned outwardly from the intermediate raised portion and near to the radially outer portion of the raised edge region.

16. The method as recited in claim 1, wherein said ground penetrating member has a generally flattened configuration, with a surface area which, when the ground penetrating member is moved through the green surface, located near a ground which is displaced into said raised edge region.

17. A method of repairing a dent in a golf green having a green surface caused by a golf ball impacting the green surface to form the dent which has a recessed region having a recessed location, and also a raised edge region radially outwardly of the recessed region at a raised edge location and extending at least partially around the recessed region, said method comprising:

a) providing a restoring tool comprising a base member having a compression surface and a ground penetrating member, with said restoring tool being mounted to a golf club with the base member being located at a grip portion of the golf club in a manner that with the golf club in an inverted position with the grip portion at a lower location, the compression surface is facing downwardly to press downwardly against the raised edge region;

b) positioning said ground penetrating member in a first stowed position where the ground penetrating member extends over the compression surface, and then moving the ground engaging member outwardly from the stowed position to an operating position extending outwardly from the compression surface;

c) positioning the tool with the ground penetrating portion at the raised edge location of the dent and with the golf club extending in a generally upward direction from the green surface, and with a ball striking end portion of the club at an upper location, moving the tool so that the ground penetrating member penetrates into the golf green and the compression surface engages the raised edge region and presses the raised edge region in a direction with a substantial downward force component to press the raised edge region downwardly and to cause a lateral displacement of material in the raised edge region radially inwardly toward the recessed region of the dent.

18. The method as recited in claim 17, wherein said ground penetrating member is provided with a hinge connection at one side compression surface, said method further comprising moving the ground penetrating member from the compression surface about said hinge connection to said operating position.

19. The method as recited in claim 17, further comprising releasably locking said ground penetrating member in said operating position.

20. The method as recited in claim 17, further comprising releasably locking the ground penetrating member in said operating position by utilizing a protrusion member mounted to said ground penetrating member, and moving said protrusion member with the ground penetrating member from the stowed position to the operating position over a surface which resists movement of the ground penetrating member from the stowed position to the operating position and also resists movement of the ground engaging member from the operating position back to the stowed position, whereby said ground engaging member is yieldingly held in its stowed position and also yieldingly held in its operating position.

21. The method as recited in claim 17, wherein said ground penetrating member is configured with length and width dimensions such that when said ground penetrating member is located in its stowed position the ground engaging member is located substantially within an area of an end portion of the grip portion of the golf club.

* * * * *